April 21, 1953 G. B. LOPER ET AL 2,636,160
VERTICAL COMPONENT LOW-FREQUENCY GEOPHONE
Filed Aug. 29, 1949 2 SHEETS—SHEET 1
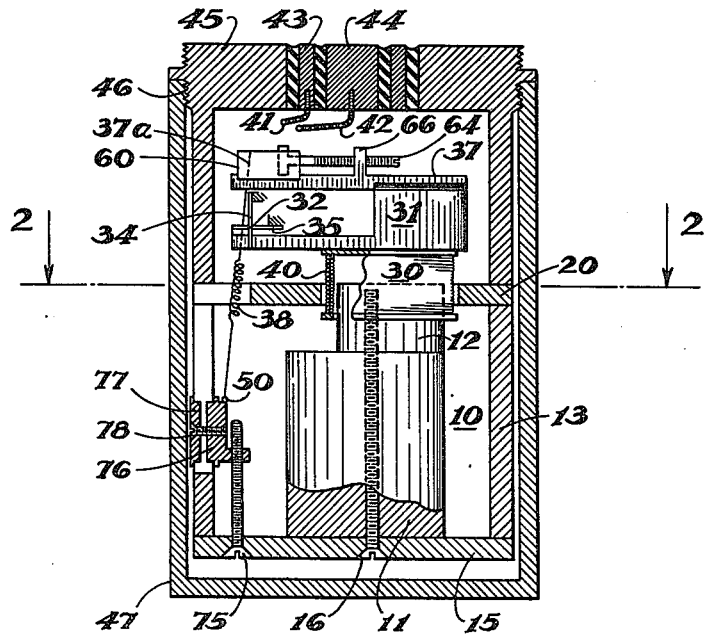
FIG. 1
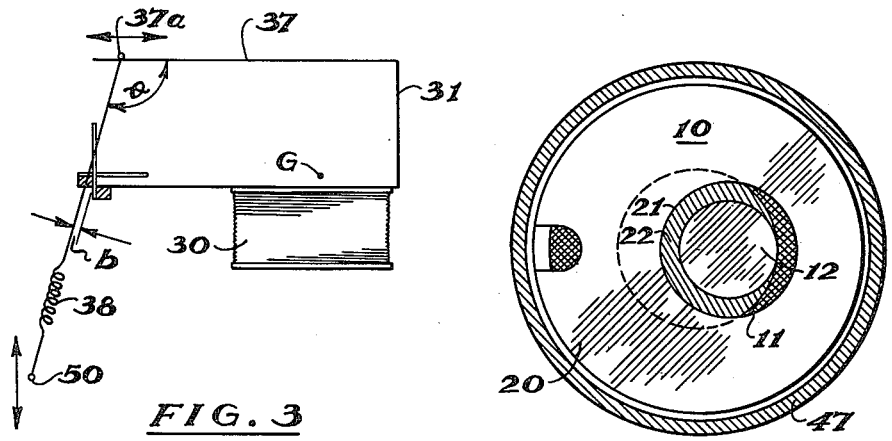
FIG. 3
FIG. 2
George B. Loper
Stanley N. Heaps
INVENTORS.
BY D. Carl Richards
AGENT.

April 21, 1953 G. B. LOPER ET AL 2,636,160
VERTICAL COMPONENT LOW-FREQUENCY GEOPHONE
Filed Aug. 29, 1949 2 SHEETS—SHEET 2

George B. Loper
Stanley N. Heaps
INVENTORS.

BY D. Carl Richards
AGENT.

Patented Apr. 21, 1953

2,636,160

UNITED STATES PATENT OFFICE 2,636,160

VERTICAL COMPONENT LOW-FREQUENCY GEOPHONE

George B. Loper and Stanley N. Heaps, Dallas, Tex., assignors, by mesne assignments, to Socony-Vacuum Oil Company, Incorporated, New York, N. Y., a corporation of New York Application August 29, 1949, Serial No. 112,902

13 Claims. (Cl. 340—17)

This invention relates to vibration sensitive devices and more particularly to a small low-frequency detector or geophone for use in the study of seismic disturbances such as in geophysical prospecting.

Seismograph geophones generally have a natural frequency near the lower end of the 20 to 80 C. P. S. seismic frequency band. Common practice is to design geophones to have a natural frequency near or slightly below 30 C. P. S. To avoid excessive expense in providing explosives for generation of seismic waves, the geophone with its associated amplifying equipment is required to have sensitivity high enough to detect natural ground unrest. The explosive charge used is of such size that the seismic waves generated have amplitude sufficient to be detected above and distinguished from the natural ground unrest. Various expedients are then utilized to provide a geophone of the required sensitivity to detect such seismic waves. In dynamic geophones a magnetic field is employed having maximum practical strength (5,000–8,000 gauss). A coil having a plurality of windings is then designed to operate in the magnetic field for voltage generation proportional to the velocity of motion of the seismic waves. In order to support such coils without undue initial deflection, the associated springs must be so stiff that the natural frequency of the suspension is well within the seismic range. Such geophones therefore are not suited for study of low-frequency waves. It has been found to be particularly difficult to provide a geophone of required sensitivity having a small size and a fundamental natural frequency in the range below 10 C. P. S., with all other natural frequencies, due to other vibrational modes of the various parts, above the seismic range so as to have negligible influence upon the response.

In accordance with the present invention, a very low natural frequency geophone is provided comprising two relatively movable elements, one of which is a coil and the other a magnetic structure for establishing a magnetic flux linking the coil. A cantilever support is provided having a pivotal axis at one end and one of said elements adjacent the opposite end and means for providing a low natural frequency of vibration comprising a spring having a line of action extending in a straight line from one side of the pivotal axis to the other and passing adjacent the pivotal axis for applying a force acting through a lever arm which decreases upon an increase in the force of the spring and which increases with a decrease in the force of the spring for developing a moment in direction opposing the gravity moment on the cantilever support.

In a preferred form of the invention, means are provided for adjusting the rate of change of the force exerted by the above-mentioned spring as the coil is deflected from its equilibrium position.

For further objects and advantages of the invention, reference may now be had to the following description taken in conjunction with the accompanying drawings in which:

Fig. 1 is a partially diagrammatic view of a geophone with portions thereof shown in section;

Fig. 2 is a view of a magnet structure taken along line 2—2 of Fig. 1;

Fig. 3 is a slightly enlarged diagrammatic representation of the coil suspension system of Fig. 1;

Figure 5:
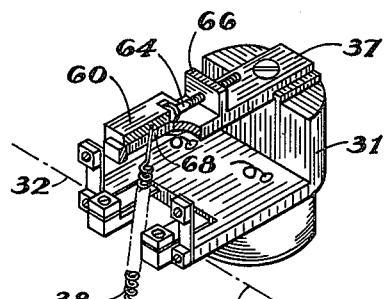
Fig. 5 is an isometric view of the coil suspension of Fig. 6.

Referring now to Fig. 1, the present invention has been illustrated as a geophone including a magnet assembly 10 comprising a permanent magnet 11 having an eccentric pole piece 12. The magnet 11 is mounted coaxially within a low reluctance casing 13, which is preferably cylindrical in form. More particularly, the magnet 11 is fastened to a bottom closure disc 15 as by bolt 16 passing through magnet 11 and threadedly engaging the eccentric pole piece 12. A flat disc forming pole piece 20 is welded to the top of the cylinder 13. As illustrated in Fig. 2, the disc 20 is provided with a circular aperture 21. The aperture 21 is eccentrically positioned in the face of the disc 20, with its axis coinciding with the axis of the eccentric pole piece 12. The radius of the aperture 21 is made equal to the radius of the eccentric pole piece 12 plus the length of the desired air gap.

A coil structure 30 is positioned in the air gap 22 for generation of a working voltage. The coil 30 is supported or carried by a yoke 31 made of brass or other non-magnetic material. The yoke 31, acting as a cantilever arm, is pivoted for rotation about an axis 32. The pivot is preferably frictionless as to present negligible resistance to deflection of the coil 30 and may comprise two pairs of crossed springs 34 and 35

(one of each pair being shown in Fig. 1). The springs 34 and 35 lie in planes perpendicular one to the other with both planes common to axis 32. Springs 34 are vertical with the lower ends thereof connected to the yoke 31. Their upper ends are connected to a frame or otherwise supported from the magnet assembly of the geophone as indicated by the cross-hatched sections.

The horizontal springs 35 are connected at their left ends to the yoke 31 and supported at their right ends from the case or magnet assembly in a manner later to be described. The springs 34 and 35 preferably are made of very light stock. They are chosen so to produce a very low natural frequency for the coil 30, of for example 5-10 C. P. S. Such springs alone, however, ordinarily would permit undue initial deflection of the coil greatly exceeding permissible limits.

In accordance with the present invention, the gravitational moment tending to rotate the coil about axis 32 is reduced to zero independently of the springs 34 and 35. The natural frequency may then be made to depend entirely upon the inertia of the pivoted structure including coil 30 and the stiffness of the very light springs 34 and 35. More particularly, a beam 37 is connected at its right end to the upper surface of the yoke 31. The beam extends horizontally in direction above and toward the axis 32 and has, as will later be explained, a horizontally adjustable link 37a. A spring 38 is connected at its upper end to the link on the free end of the beam 37. The lower end of the spring 38 is linked to the magnet assembly. By adjustment of the tension in the spring 38, the steady mass formed by the yoke 31 and the beam 37 supporting coil 30 may be suspended in an equilibrium position. The spring 38 extends from beam 37 to the magnet structure past the axis 32 on the side thereof opposite coil 30. Thus positioned, it exerts a force upon the vertical spring 34 maintaining it in tension. Additionally, since the force exerted by spring 38 has a horizontal component, it exerts a force upon the horizontal spring 35, maintaining it in tension. The possibility of any forces other than tension and simple bending on the springs 34 and 35 is thus eliminated.

The enlarged view of Fig. 3 may now be referred to for a more complete understanding of the above-described coil suspension system. The yoke 31, diagrammatically illustrated in single line form, has its mass so distributed that the center of gravity (G) of the entire suspension is normally on a line horizontally displaced from the axis 32. The spring 38 is fastened to the beam 37 above the axis 32. The axis of the spring 38 lies in a vertical plane which is common to the axis of the coil 30 and slopes in this plane such that the angle θ is greater than 90°. When such is the case, the force exerted by the spring 38 on the coil suspension effectively acts through a lever arm (b) which is equal in length to a perpendicular erected on the axis of spring 38 and extending to the axis 32. By varying the position of the link 37a to which the spring 38 is connected, the length of the lever arm (b) may be adjusted. By varying the position of the link 50 at which the lower end of the spring 38 is anchored to the magnet assembly, the force exerted by the spring may be varied.

Assume now that the magnet assembly is fixed in position, i. e., planted at a selected geophone location in the earth, and that the coil is set into oscillation. When the coil 30 travels downward, the link 37a travels to the right, decreasing the effective length of lever arm (b). At the same time, the distance between link 37a and point 50 is increased slightly, thus increasing the tension in spring 38. By proper adjustment of the length of the lever arm (b) (adjustment of the position of link 37a) and the force exerted by the spring 38 (adjustment of the position of link 50), the effect of increase in the restoring force of spring 38 may be wholly compensated by the effect of a decrease in the length of the lever arm (b). In such case, springs 34 and 35 alone determine the natural frequency of the system. To effect a frequency lower than that due to springs 34 and 35, the effect of an increase in the tensile force may be made less than the effect of a coexistent decrease in the lever arm (b). The spring 38 then contributes a negative stiffness to the system to offset the restoring forces exerted by springs 34 and 35 due to bending. By proper adjustment, it has been found that coil suspensions of considerable mass may be supported in equilibrium and have natural frequency as low as 2 C. P. S.

Figure 4:
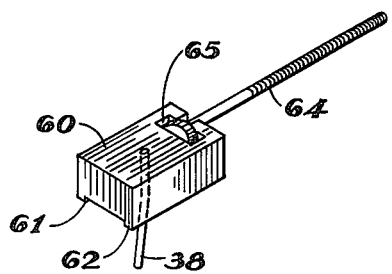
Fig. 4 is an enlarged isometric view of the carriage element of Figs. 1, 5, and 6.

Figs. 1, 4, and 5 show in detail the system for adjusting the position of link 37a. More particularly, a carriage 60 is slidably mounted on the beam 37 and has depending edges 61 and 62, Fig. 4, which form a slideway complementary with the upper surface of beam 37. The upper end of the spring 38 is soldered or otherwise anchored in the carriage 60. The head of an adjusting screw 64 is set into a recess 65 in the end of carriage 60. The position of the carriage 60 on the beam 37 is adjusted by rotation of the screw 64 which threadedly engages an upturned portion 66 of the beam 37. Beam 37 is slotted at point 68, Fig. 5, to permit free travel of the upper end of spring 38 with the carriage 60.

As above mentioned, the magnitude of the force exerted by the spring 38 is controlled by adjustment of the position of link 50 under control of screw 75, Fig. 1, which determines the position of the bracket 76. The bracket 76 and a disc 77 having flanged edges travel in a vertical slideway in the wall of cylinder 13. To adjust the tension of spring 38, the lock screw 78 is loosened to permit the bracket 76 and disc 77 to be moved upon rotation of screw 75. Thereafter, the lock screw 78 may be tightened firmly to hold the bracket to the wall of the cylinder 13.

Figure 6:
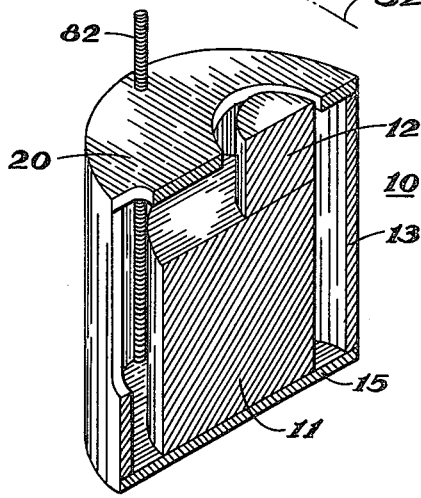
Fig. 6 is an exploded sectional view of the geophone.

The manner in which the coil suspension system including the yoke 31 is supported from the case or frame is illustrated in the sectional view of Fig. 6. A short cylinder or supporting member of non-magnetic material is milled to provide anchors for the ends of the springs 34 and 35. More particularly, the supporting member 80 is milled in its center portion to accommodate the coil suspension. The bottom 81 of the supporting member 80 is flat and rests upon the disc 20 of the magnet assembly 10. As illustrated, a bolt 82 passing through the discs 15 and 20 engages the threaded aperture 84 in member 80 rigidly to connect the supporting member 80 to the magnet assembly 10. It is to be understood that similar provisions are made in the half of the geophone omitted from the sectional Fig. 6. When thus positioned, the coil 30 extends in part below the lower surface 81 of the support member 80 encircling the upper end of the pole piece 12. Vibration of the coil 30 in the air gap between pole piece 12 and the pole disc 20 varies the flux linking coil 30 to induce a voltage therein. The support member 80 has a transverse beam 86 for support of the coil yoke 31. More particularly, the transverse beam 86 has a central depending portion 87 to which the springs 35, one of which is shown in Fig. 6, are fastened.

The conductor 42 from the coil 30 is fed through an insulated opening 89 in yoke 31 and is connected to a terminal 90 mounted in an insulating block 91 which is fastened to or otherwise supported by the frame member 80 to provide a signal path from the coil to the geophone terminals. Conductors 41 and 42 terminated in output ring terminals 43 and 44 of Fig. 1 are to be connected to terminal 90 and a corresponding terminal omitted from Fig. 6. Contacts engaging ring terminals 43 and 44 may be included in circuit with an amplifying-recording apparatus for recordation of the voltages generated. The cap member 45 is connected to the magnet assembly disc 20 by means later to be described. The cap 45 is larger in diameter than the cylinder 13, and a portion thereof threadedly engages a low reluctance cylindrical housing or can 47 which is of convenient shape for use in earth bore holes.

Figure 7:
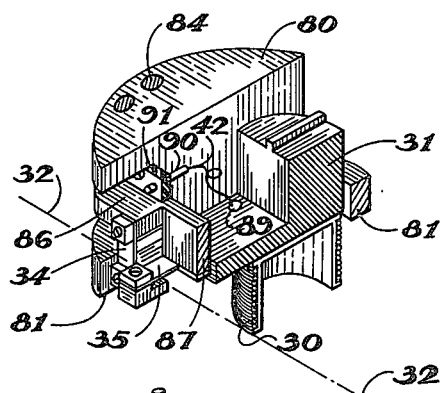
Fig. 7 is an enlarged view of the yoke of Figs. 1 and 6.
Figure 7:
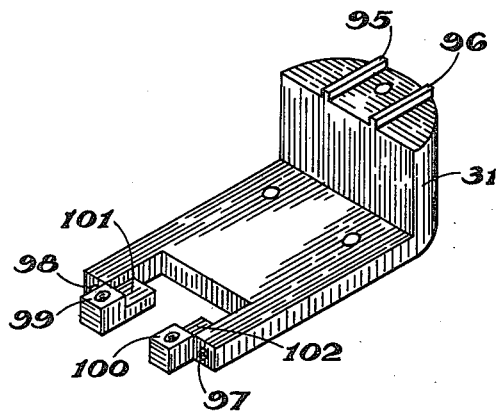

The yoke 31 is illustrated in Fig. 7 as having an upper surface provided with guide extensions 95 and 96 properly to position the beam 37. The springs 34 are fastened to the vertical surfaces 97 and 98 and extend upwardly to engage the frame member 80 of Figs. 5 and 6. The horizontal springs 35 are fastened to the surfaces 99 and 100. A center portion of the yoke is milled away to permit the springs 35 to be anchored to the underside of the depending portion 87 of the frame member 80 of Fig. 6. Further, the yoke 31 is partially milled away at 101 and 102 to permit unobstructed flexing of the springs 35.

A geophone constructed as above described embodied advantageous which include high sensitivity at very low frequencies in a structure which is very small physically. In one practical case, the geophone illustrated in Fig. 1, having an adjustable natural frequency below three cycles per second had a diameter of 2.5 inches and an overall length of 3.5 inches. Such a geophone is small enough to be clamped at subsurface locations in relatively inexpensive small diameter bore holes for the study of seismic waves having frequencies lower than usual seismic bands.

The frequency response of the geophone may be made to be relatively flat from slightly above resonance to frequencies well above the range of seismic frequencies by properly designing and orienting the parts of the suspension and providing the system with the proper damping. In one embodiment of the geophone, the steady mass including coil 30, yoke 31, beam 37, etc., weighed 63.8 grams. It had a moment of inertia of 480 gm. cm.$^2$ with respect to the axis 32. The distance from the axis 32 to the center of gravity of the steady mass was 2.4 cm. Spring 38, maintaining the suspension in equilibrium, comprised 30 turns of .032" diameter spring stock wound as a helix with 1/8 in. inside diameter and exerted a force of approximately 4 pounds on the coil suspension. Spring 38 was made of material having a zero temperature coefficient of elasticity so that the geophone would remain in equilibrium once adjusted even though placed in a location of varying temperature. There were 1,010 turns of No. 37 gage wire wound on coil 30 and connected to the output terminals 33 and 34. The coil 30 had a D. C. resistance of 106 ohms and when operating into a load impedance of 300 ohms the geophone was approximately half-critically damped at its resonant frequency. Its response when then flat from 5 cycles to well above the seismic range, permitting faithful recordation of all seismic waves having frequencies above 5 cycles to well above the seismic range.

Though the invention has been illustrated and described in detail, it is to be understood that modifications may be made within the scope of the invention as set forth in the appended claims.

What is claimed is:

1. A low-frequency geophone comprising two relatively movable elements, one of which is a coil and the other a magnetic structure for establishing a magnetic flux linking said coil, a cantilever pivoted at one end and supporting one of said elements at the opposite free end thereof, means for producing a low natural frequency of vibration of said cantilever and said element supported thereby comprising a tension spring interconnecting said magnetic structure at a point removed in one direction from said support and said cantilever at a point substantially removed in an opposite direction from the pivotal axis thereof but whose axis lies along the lines substantially vertical and extends adjacent to and from one side of said pivotal axis to an opposite side thereof for applying to the cantilever a moment acting in opposition to the gravity moment tending to rotate the cantilever arm in the opposite direction, relative movement between said pivoted end of said cantilever and the steady mass at the opposite end being effective respectively to decrease and to increase the length of the lever arm from the pivotal axis to the line of action of the spring at rates respectively greater and less than the corresponding rates of increase and decrease in the tension of said spring due to said relative movement between the opposite ends of said cantilever arm.

2. A low-frequency geophone cylindrical in shape and of small size for use in bore holes which comprises a magnetic structure characterized by a horizontal annular air gap with a radial magnetic flux concentrated therein, a coil positioned in said flux, supporting means for said coil including a pivot supported from said structure spaced laterally from said coil forming a horizontal axis for rotational vibration of said coil, and a spring exerting a tensile force between said supporting means and said magnetic structure whose axis is substantially vertical and lies along a line adjacent said horizontal axis and on the side thereof opposite said coil for applying to said supporting means a moment equal and opposite to the gravity moment on said supporting means to maintain said coil in an equilibrium position in said air gap.

3. A low-frequency geophone comprising a cylindrical magnet structure including a permanent magnet positioned centrally thereof, a disc forming a closure for said magnet structure and having an aperture encircling the end of said permanent magnet with an air gap therebetween threaded by magnetic flux, a vibratory element including a coil positioned in said air gap, means forming a pivot for said vibratory element, resilient means fastened to said vibratory element above said pivot and to said cylindrical magnet structure below said pivot and extending along a line adjacent said pivot and on the side thereof opposite said coil to support said coil in equilibrium in said flux independent of said pivot, and means to adjust said resilient means to vary the natural frequency of vibration of said coil relative to said magnet structure.

4. A low-frequency geophone comprising a cylindrical magnet structure including a permanent magnet positioned centrally thereof, a disc forming a closure for said magnet structure and having an aperture encircling the end of said permanent magnet with an air gap therebetween threaded by magnetic flux, a vibratory element including a coil positioned in said air gap, means forming a pivot for said vibratory element, resilient means fastened to said vibratory element above said pivot and to said cylindrical magnet structure below said pivot and extending along a line adjacent said pivot and on the side thereof opposite said coil, means for adjusting the tension of said spring, and means for adjusting the distance between said line and said pivot substantially independent of the tension in said spring to suspend said coil in said flux in equilibrium and for vibration thereof at a selected natural frequency.

5. A vibration sensitive device comprising a beam, a coil supported at one end of said beam, a permanent magnet structure for establishing a magnetic flux linking said coil, a resilient suspension supported from said permanent magnet structure including crossed flat springs at the other end of said beam permitting rotation of said coil about a horizontal axis, and a helical spring secured to said beam above said axis and extending to said permanent magnet and said axis on the side thereof opposite said coil to support said coil and said beam in an equilibrium position for generation of a voltage upon vibration of said permanent magnet relative to said coil.

6. A low-frequency vertical seismometer comprising a cylindrical casing, a magnet having a cylindrical vertical pole piece associated therewith eccentrically positioned in said casing, a second pole piece having an aperture to receive one end of said cylindrical pole piece with an air gap therebetween, a coil positioned in said air gap and encircling said end of said vertical pole piece, resilient means supported from said second pole piece forming a pivot for said coil at an axis displaced horizontally from said coil adjacent the side of said casing opposite said vertical pole piece, and a tension spring disposed with its axis substantially vertical on the side of said pivot opposite said coil for applying a force to said coil in direction to increase the deflection in opposition to the restoring force of said resilient means.

7. A low frequency seismometer which comprises a magnet structure including a vertical, cylindrical magnet, a flat pole piece having an opening therein to receive the upper end of said magnet with an air gap between said magnet and said pole piece, a coil positioned in said air gap and encircling the upper portion of said magnet, a frictionless pivot displaced horizontally from said coil and in the same horizontal plane as the center of gravity of the coil assembly, a tension spring interconnecting said assembly and said magnet structure and acting along a line closely adjacent the axis of said frictionless pivot and opposite said coil to maintain said coil in equilibrium, means for adjusting the position of said line with respect to said axis to vary the rate of change of force applied by said tension spring to said assembly upon deflection from equilibrium, and means for varying the magnitude of said force independently of the position of said line whereby the natural frequency of said assembly may be adjusted.

8. A low-frequency geophone comprising a cylindrical casing, a magnet assembly having an annular air gap adjacent one side of said casing, a coil structure including a plurality of windings positioned in said air gap, a suspension for said coil structure adjacent the opposite side of said casing permitting free rotation about an axis displaced from and perpendicular to the axis of said windings, and means coupled between said coil structure above said suspension and said assembly and on the opposite side of said axis from said windings and forming a coupling for said coil structure for oscillation in a predetermined period about a position of equilibrium.

9. A low-frequency geophone which comprises a cylindrical magnet structure characterized by a vertically adjustable link adjacent the edge of said cylindrical structure and a horizontal annular air gap at the end of said structure with a radial magnetic flux concentrated therein positioned diametrically opposite said adjustable link and adjacent the edge of said structure, a vibratory element including a coil at one end thereof and a horizontally adjustable link at the other end thereof, a pivot for said vibratory element supported from said magnet structure and spaced horizontally from said coil and below said horizontally adjustable link for mounting said coil in said air gap, and a helical spring interconnecting said links and acting along a line adjacent said pivot and opposite said coil to maintain said vibratory element in equilibrium, said adjustable links being operative independently to adjust the tension in said spring and the spacing of said spring from said pivot to control the natural frequency of vibration of said coil in said air gap.

10. A low-frequency geophone of small size for use in bore holes comprising a cylindrical case, a magnetic structure characterized by contiguous elements producing magnetic flux across an air gap therebetween in a plane normal to the length of said case and eccentric to the axis thereof, a coil positioned in said air gap for generation of a voltage upon vibration thereof, supporting means for said coil carried by said magnetic structure including a pivot adjacent to the wall of said cylindrical case on the side thereof opposite said air gap, and a tension spring mechanically interconnecting said supporting means and said magnetic structure and extending adjacent said pivot on the side of said pivot opposite said coil for supporting said coil in equilibrium in said air gap.

11. A low-frequency geophone of small size for use in bore holes comprising a cylindrical case, a magnetic structure characterized by contiguous elements with an air gap therebetween in a plane normal to the length of said case and eccentric to the axis thereof, said structure including means for establishing magnetic flux across said air gap, a coil positioned in said air gap for generation of a voltage upon vibration thereof with respect to said flux, a support for said coil including a pivot adjacent to the walls of said cylindrical case on the side thereof opposite said air gap, and a spring connected to said supporting means above said pivot and to said magnetic structure below said pivot and extending adjacent said pivot on the side thereof opposite said coil for supporting said coil in equilibrium in said air gap.

12. In low-frequency geophone, the combination which comprises a cylindrical magnetic structure characterized by contiguous elements with an air gap therebetween in a plane normal to the length of said structure and eccentric to the axis thereof, said structure including means for establishing magnetic flux in said air gap, a coil positioned in said air gap for generation of a voltage upon vibration thereof, a support for said coil including a pivot adjacent to the edge of said cylindrical structure on the side thereof opposite said eccentric air gap, and a tension spring mechanically interconnecting said supporting means and said magnetic structure and extending within the perimeter of said cylindrical magnetic structure adjacent said pivot on the side of said pivot opposite said coil for supporting said coil in equilibrium in said air gap.

13. A low-frequency geophone comprising a casing, a horizontal plate of magnetic material disposed within said casing with an opening displaced from the center of said plate, means including a permanent magnet having a pole piece disposed within said opening for producing a magnetic field extending radially thereof, a coil encircling said pole piece disposed within said magnetic field, a horizontally extending cantilever arm supporting said coil at one end, resilient means pivotally anchoring and supporting the opposite end of said arm, a beam disposed above said arm having one end secured to said arm above said coil and the other end disposed above said pivoted end of said arm, a horizontally adjustable link carried by said beam in position above said pivoted end of said arm, a vertically adjustable link below said plate and disposed along the side of said casing opposite that adjacent said displaced opening, and means for reducing the natural frequency of vibration of said coil and said arm comprising a coil spring interconnecting said links, its line of action passing adjacent to but slightly spaced from the pivotal axis of said arm on the side thereof remote from said coil for developing a moment acting upon said arm in a direction to counterbalance the moment developed by gravity.

GEORGE B. LOPER.
STANLEY N. HEAPS.

References Cited in the file of this patent

UNITED STATES PATENTS

| Number | Name | Date |
|---|---|---|
| 1,749,044 | Niles | Mar. 4, 1930 |
| 2,067,636 | Heiland | Jan. 12, 1937 |
| 2,272,984 | Ritzmann | Feb. 10, 1942 |
| 2,390,187 | Sharpe | Dec. 11, 1945 |

FOREIGN PATENTS

| Number | Country | Date |
|---|---|---|
| 311,558 | Great Britain | May 16, 1929 |

OTHER REFERENCES

The Galitzen Seismographs in Engineering, April 13, 1923, pp. 474–476.

A Study of Some Seismometers, Irland, Tech. Paper 556 of U. S. Bureau of Mines (1934), pp. 14–19, 43–45.

Film Recording Seismograph, Electronics, May 1943, pp. 89–92.